Dec. 29, 1942.  E. S. GANDRUD  2,306,432
METALLIC SUBSTITUTE FOR PNEUMATIC TIRES
Filed June 11, 1942
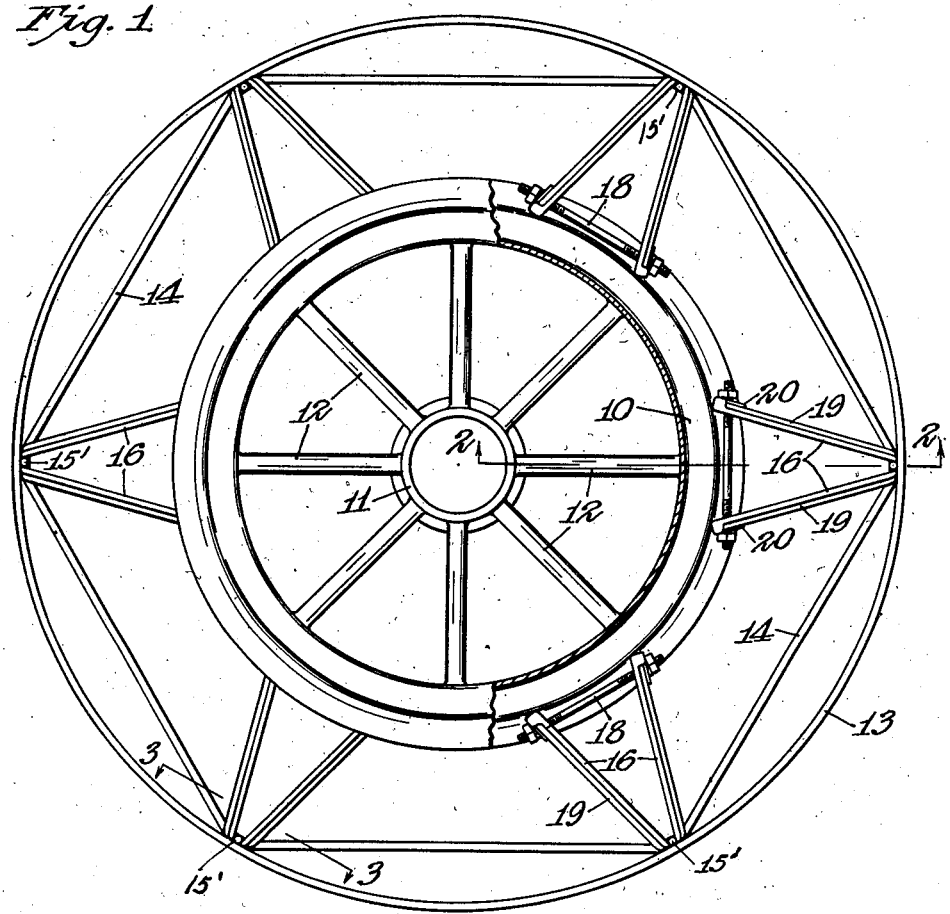
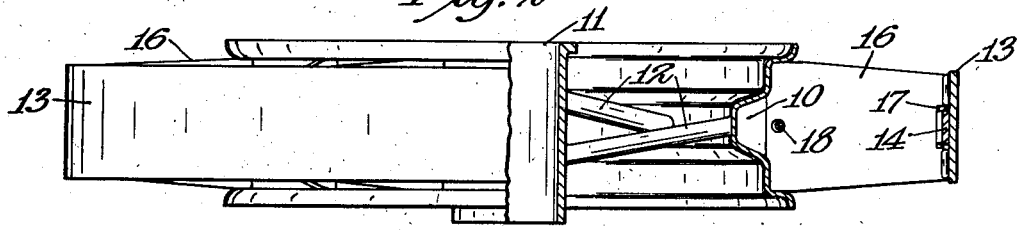
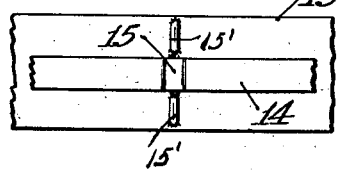 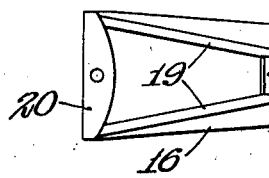
Inventor
Ebenhard S. Gandrud
By Michael Michael
Attorneys Patented Dec. 29, 1942

2,306,432

UNITED STATES PATENT OFFICE 2,306,432

METALLIC SUBSTITUTE FOR PNEUMATIC TIRES

Ebenhard S. Gandrud, Owatonna, Minn.

Application June 11, 1942, Serial No. 446,565

14 Claims. (Cl. 301—87)

My present invention provides an efficient metallic tire especially adapted for use as an emergency substitute for pneumatic tires; and generally stated, the invention consists of the novel devices, combination of devices, and arrangement of parts hereinafter described and defined in the claims.

More definitely stated, this improved metallic tire is so designed that it may be readily applied to a wheel rim that was originally designed for the application thereto of a pneumatic tire, and which, when this metallic tire is applied thereto, will have the diameter of a properly applied, or originally intended tire, and will act as an efficient, though less resilient substitute for the pneumatic tire. The rim of the tire attachment may be made either smooth or with traction lugs or projections.

For an important reason, to be hereinafter fully noted, tension bars or rods are rigidly secured to the interior of the tire rim, and at their ends are rigidly secured thereto. This securing of the tension bars to the interior of the tire rim is made by welding the adjacent ends of the tension rods to the rim, in close or abutting contact. In practice, these tension bars may be, and in fact preferably are, made integral from a fixed piece or bar bent into polygonal form.

Between the wheel rim and the tire rim are interposed wedge-acting laterally contractible and endwise extensible struts. These struts are made up of outwardly converging wedge-acting plates, the outer ends of which engage the tire rim and the inner ends of which are seated in the channel of the wheel rim. By means of bolts passed therethrough, the converging strut plates can be drawn more closely together, thereby contracting the struts and increasing the operative length thereof, so that the struts will be frictionally but very firmly anchored to the wheel rim.

The above noted general features and other highly important features and actions are illustrated in the accompanying drawing wherein like characters indicate like parts throughout the several views.

Referring to the drawing:

Fig. 1 is a side elevation of the improved tire attachment showing the same applied to a wheel rim normally designed for the application thereto of a pneumatic tire, some parts of the wheel rim being broken away and some parts being shown in section;

Fig. 2 is a view partly in plan and partly in horizontal section taken approximately on the line 2—2 of Fig. 1;

Fig. 3 is a fragmentary view showing parts found in the vicinity of the line marked 3—3 on Fig. 1, but with the strut members removed; and Fig. 4 is a side elevation looking at one of the plates of one of the struts.

As already indicated, the wheel may vary in form but is assumed to have an externally channeled metallic rim 10. The particular wheel shown involves also a hub 11 and spokes 12.

The rim of the metallic tire attachment is indicated by the numeral 13 and, as shown, is a wide-faced steel band which, for a particular wheel, should be of a diameter equal to the external diameter of a pneumatic tire properly applied to the particular wheel. Tension bars 14, preferably of flat steel and considerably narrower than the rim 13, are, at their ends, formed integral, and are welded to the interior of the rim 13. The abutting or integrally formed end portions of the tension bars 14 are welded to the rim 13 by weld formed lugs 15 that extend on the interior of the rim 13 outward on both sides of the tension bars, to form spacing ribs 15'. The number of the tension bars or rod forming portions may be varied, but for the particular wheel shown, the rim 13 is provided with six of the said tension portions; and hence, a corresponding number of struts are employed in connection with this attachment.

Each strut is made up of two plates 16. These plates 16, at their inner ends, fit the channel of the wheel rim 10, at least to such an extent that they are anchored on the wheel rim adjacent and in close engagement with the flanges thereof. The outer ends of these plates 16 engage the interior of the rim 13 at the welded or anchored ends of the tension bars and in close engagement with the spacing ribs 15', which latter serve to definitely space the outer ends of the struts. At their outer ends, the plates 16 have notches 17 that clear and straddle the welded end portions of the tension bars, with the extreme outer laterally spaced ends of the said plates pressing against the interior of the rim 13 on opposite sides of the ends of the tension bars. The strut-forming plates 16 are considerably longer than the space between the rims 10 and 13, and this causes the said plates to diverge inwardly, radially of the tire structure. Nut-equipped bolts 18 are passed through the inner ends of the plates 16 and, when tightened, draw the inner ends of the plates into very tight frictional engagement with the wheel rim 10, and at the same time press the outer ends of the struts radially outward against the interior of the rim 13. The plates 16 are shown as provided with longitudinal reinforcing ribs 19 and with thickened base portions 20.

When the tire attachment is applied as shown and above described, it will be very firmly locked to the wheel rim, and will be centered in respect thereto. The outward pressure of the tightened struts will put tension on the bars 14 and the latter will resist any shifting of the outer portions of the struts in respect to the rim 13 or of the rim 13 in respect to the wheel rim. When the bolts 18 are tightened, high tension will be put on the strut plates and rotary shifting of the tire rim in respect to the wheel rim will be resisted not only by the tension thus applied, but by the further fact that attempted rotation of rim 13 in respect to rim 10, in a clockwise direction, for example, would simply tend to move the outer end of the advanced plate and cause the inner end thereof to more tightly bite against the wheel rim. The struts, moreover, anchor the rim 13 to the wheel rim against lateral or sidewise shifting or tilting movements. The strut plates are quite wide and are anchored against the wheel rim adjacent to both rims thereof, and the outer ends of the strut plates engage the interior of rim 13 nearly or quite to its outer edges.

Under the outward pressure of the struts, and under load strains, the tension bars take the greater part of the strain and relieve the strain on the tire rim, and keep the tire rim concentric to the wheel rim. Moreover, these tension bars take strains produced by a load on any one of the several rim segments that happen to be engaged with the ground, and flattening of the tire rim is thus resisted.

The tire rim and the strut plates are made as wide, or substantially as wide as the channel in the wheel rim; and this gives lateral stability to the tire attachment. The tension bars are made much narrower than the tire rim, and the outer ends of the strut plates are notched to give an interlocking action that locks the tire rim against lateral shifting movements on the outer ends of said strut plates.

The wheel rim illustrated has six struts, and hence six tension acting bars or rods, but of course, the number of these elements will depend considerably on the diameter and circumference of the wheel and rim. The tension acting bars or members are preferably made from a single bar or rod bent to proper polygonal form, inserted into the tire rim by a single operation, and then welded to the interior of the rim, as already indicated.

As is evident, the attachment may be very quickly and easily applied to a wheel rim of the above described or similar character. The attachment is not intended as full or completely satisfactory substitute for a pneumatic tire, but for use chiefly where pneumatic tires can not be obtained. However, it is well adapted to be carried as an emergency tire for application to the wheel of an automobile or pneumatic tire-equipped vehicle, in case of a puncture or blowout when an additional pneumatic tire is not available. Modern vehicle wheels adapted for equipment of pneumatic tires are of such less diameter than the diameter of the tire, that the wheel rim can not be used to drive the car or vehicle on the wheel rim itself.

It will, of course, be understood that various alterations in the structure herein illustrated may be made within the scope of the invention herein disclosed and claimed.

What I claim is:

1. A metallic tire comprising a rim and a plurality of endwise extensible struts circumferentially spaced within said tire rim with their outer ends reacting against said rim, the inner end portions of said struts being constructed and arranged for clamping engagement with the rim of a wheel that is of much less diameter than said tire rim, and tension bars anchored to the interior of said wheel rim and extending between the points of contact of said struts with said tire rim.

2. The combination with a wheel having an externally channeled rim, of a tire rim of much greater diameter than said wheel rim, concentrically spaced around the latter, and endwise extensible struts circumferentially spaced within said tire rim with their outer ends reacting against the interior of said tire rim and with their inner portions clamped against said wheel rim, and tension rods anchored to the interior of said tire rim and extending between points of contact of said struts with said tire rim.

3. The structure defined in claim 1 in which said struts are formed by diverging plates provided at their inner ends with means for drawing the same closer together to thereby endwise extend the same.

4. The structure defined in claim 1 in which said struts are formed by diverging plates provided at their inner ends with means for drawing the same closer together to thereby endwise extend the same, said strut plates, at their outer ends, being notched to clear and straddle the adjacent anchored ends of said tension bars.

5. The structure defined in claim 1 in which said struts are formed by diverging plates provided at their inner ends with means for drawing the same closer together to thereby endwise extend the same, said strut plates, at their outer ends, being notched to clear and straddle the adjacent anchored ends of said tension bars, the ends of said tension bars being anchored to said tire rim by weldings that form spacing lugs against which the extreme outer ends of said strut plates engage.

6. The structure defined in claim 1 in which said struts are formed by diverging plates provided at their inner ends with means for drawing the same closer together to thereby endwise extend the same, said strut plates, at their outer ends, being notched to clear and straddle the adjacent anchored ends of said tension bars, the ends of said tension bars being anchored to said tire rim by weldings that form spacing lugs against which the extreme outer ends of said strut plates engage, said tension bars being much narrower than said tire rim and the said welded spacing lugs being extended transversely on both sides thereof.

7. The combination with a wheel having an externally channeled rim, of a tire rim of much greater diameter than said wheel rim, concentrically spaced around the latter, and endwise extensible structs circumferentially spaced within said tire rim, said struts being made up each of two outwardly diverging plates, the outer ends of which react against the interior of said tire rim and the inner portions of which are clamped against the channeled rim of said wheel, draw bolts operative on the inner ends of said strut plates to draw the same closer together and increase the operative length thereof, and tension rods within said tire rim having ends welded to the latter at substantially contacting points, said tension rods being of materially less width than said tire rim, and the plates of said struts being notched at their outer ends to straddle or embrace the welded ends of said tension rods.

8. The structure defined in claim 7 in which said tire rim and strut plates are substantially as wide as the channel of said wheel rim.

9. The structure defined in claim 1, in which said tension bars are formed from an integral bar, bent into polygonal form, inserted into said tire rim, and welded to the latter with its salient angles in contact therewith, and welded thereto.

10. The structure defined in claim 2, in which said tension bars are formed from an integral bar, bent into polygonal form, inserted into said tire rim, and welded to the latter with its salient angles in contact therewith, and welded thereto.

11. A wheel structure involving an inner rim having its own hub and spokes, an outer tire rim spaced around said inner rim, spoke-acting struts independent of the spokes of said inner rim interposed between said wheel rim and tire rim, and tension-acting members anchored to the interior of said tire rim and extending between the points of contact between the said strut-acting spokes and tire rim.

12. A wheel structure involving a hub and an outer tire acting rim, spoke-acting means connecting said hub to said rim and spacing the latter from said hub, and tension-acting members anchored to the interior of said tire rim and extending on straight lines along the chord of said rim and reinforcing the latter at a plurality of points.

13. A wheel structure involving a hub and a tire-acting rim, spoke-acting struts interposed between said hub and rim structures and contacting the latter at circumferentially spaced points, and tension-acting members extending from the points of contacts with said spoke-acting struts along the line of chords of the rim, from the several points of contact between said struts and rim.

14. A metallic tire comprising a rim and a plurality of endwise extensible struts circumferentially spaced within said tire rim with their outer ends reacting against said rim, the inner end portions of said struts being constructed and arranged for clamping engagement with the rim of a wheel that is of much less diameter than said tire rim, and in which structure said struts are formed by diverging plates provided at their inner ends with means for drawing the same closer together to thereby endwise extend the same.

EBENHARD S. GANDRUD.